United States Patent [19]
Kim

[11] Patent Number: 5,614,953
[45] Date of Patent: Mar. 25, 1997

[54] IMAGE SIGNAL DECODING APPARATUS HAVING AN ENCODING ERROR COMPENSATION

[75] Inventor: Sang-Ho Kim, Seoul, Rep. of Korea

[73] Assignee: Daewoo Electronics Co., Ltd., Seoul, Rep. of Korea

[21] Appl. No.: 431,523

[22] Filed: Apr. 28, 1995

[30] Foreign Application Priority Data

Apr. 30, 1994 [KR] Rep. of Korea .................. 94-9478

[51] Int. Cl.⁶ .................................................. H04N 7/30
[52] U.S. Cl. ........................ 348/403; 348/420; 348/405
[58] Field of Search ................................ 348/408, 420, 348/405, 403, 404, 384, 390

[56] References Cited

U.S. PATENT DOCUMENTS 4,941,043  7/1990  Jass ........................................ 348/404
5,347,310  9/1994  Yamada et al. ...................... 348/405

Primary Examiner—Amelia Au
Attorney, Agent, or Firm—Anderson, Kill & Olick P.C.

[57] ABSTRACT

An error compensator for use in an image decoding system compensates a DC transform coefficient entailing a quantization error. The error compensator comprises an estimation unit for producing an estimate for a selected DC transform coefficient. The estimate is compared with a first and second values wherein the first value represents the difference value defined by subtracting a threshold value, i.e., a maximum quantization error from the DC transform coefficient and the second value represents the summation value defined by adding the maximum error to the DC transform coefficient and the threshold. If a first condition that the estimate be greater than or equal to the first value but smaller than a second value is satisfied, the estimate is selected. However, if the first condition is not satisfied, it is determined whether a second condition that the estimate be smaller than the first value is satisfied. When the second condition is not satisfied, the first value is selected; and otherwise, the second value is selected.

6 Claims, 4 Drawing Sheets

IMAGE SIGNAL DECODING APPARATUS HAVING AN ENCODING ERROR COMPENSATION

FIELD OF THE INVENTION

The present invention relates to an apparatus for decoding an encoded image signal; and, more particularly, to an image signal decoding apparatus for compensating an encoded image signal entailing quantization error.

DESCRIPTION OF THE PRIOR ART

In various electronic/electrical applications such as high definition television and video telephone systems, a video signal may need be transmitted in a digitized form. When the video signal comprising a sequence of video "frames" is expressed in a digitized form, there is bound to occur a substantial amount of digital data, for each line of a video frame is defined by a sequence of digital data elements referred to as "pixels". Since, however, the available frequency bandwidth of a conventional transmission channel is limited, in order to transmit the substantial amount of digital data through the channel, the use of a video signal encoding apparatus may become necessary to compress or reduce the volume of the data to be transmitted.

The video signal can be normally compressed without seriously affecting its integrity because there usually exist certain correlationships or redundancies among some of the pixels in a single frame and also among those of neighboring frames. Among various video compression techniques, the so-called hybrid coding technique, which combines temporal and spatial compression techniques together with a statistical coding technique, is known to be most effective.

Most hybrid coding techniques employ an adaptive inter/intra mode coding, orthogonal transform, quantization of transform coefficients, and VLC(variable length coding). The adaptive inter/intra-mode coding is a process of selecting a video signal for a subsequent orthogonal transform from either PCM (pulse code modulation) data of a current frame or DPCM (differential pulse code modulation) data adaptively, e.g., based on a variance thereof.

The orthogonal transform, which exploits the spatial correlationships between image data such as PCM data of the current frame and motion compensated DPCM data, and reduces or removes spatial redundancies therebetween, converts a block of digital image data into a set of transform coefficients. This technique is described in Chen and Pratt, "Scene Adaptive Coder", *IEEE Transactions on Communications*, COM-32, No. 3(March 1984). By processing such transformation coefficient data with quantization and VLC, the amount of data to be transmitted can be effectively compressed.

Specifically, in the orthogonal transform such as DCT (discrete cosine transform) or the like, the image data is divided into equal-sized blocks, for example, blocks of 8×8 pixels, and each of the blocks is transformed from the spatial domain to the frequency domain. As a result, one DC coefficient and a plurality of (e.g., 63) AC coefficients are obtained. The DC coefficient of the block reflects the average intensity of the pixels in the block.

The orthogonal transform coefficients resulting from the orthogonal transform are then quantized. In carrying out the quantization, various quantization step size control schemes are employed. A quantizer step size control usually means the control of the step size employed in quantizing inter-block AC and DC, and intra-block AC coefficients. Such quantizer step size control is determined based on the amount of data currently stored in a buffer memory and the complexity of the input video signal.

In these schemes, the value of the coefficients is divided by the quantizer step size and rounded to a nearest whole number to produce the quantized coefficient. Half integer values may be rounded up or down without directly affecting the quality. However, rounding towards zero tends to give the smallest code size and so is preferred. For example, with a step size "QS" of 16, all coefficients with values between 25 and 40 inclusive would give an quantized coefficient of 2. As a result, it may entail a maximum quantization error of "½×QS" for the quantized coefficient.

The quantized coefficient is then transmitted via the buffer memory to a decoding system in a receiving end. In the decoding system, the quantized coefficient is subjected to a reverse action of the encoding process such as inverse quantization wherein the quantized coefficient is multiplied by the step size to reconstruct an original image. Subsequently, the quantization error is reflected on the reconstructed image, resulting from the inverse quantization of the quantized transform coefficients entailing the maximum error, which leads to a "blocking effect" lowering the image quality.

SUMMARY OF THE INVENTION

It is, therefore, an object of the invention to provide an image decoding apparatus capable of reducing the blocking effect.

It is another object of the invention to provide an apparatus for use in an image decoding system for compensating a set of decoded transform coefficients entailing a quantization error.

In accordance with a preferred embodiment of the present invention, there is provided a method for compensating decoded image data to generate compensated image data, wherein the decoded image data includes a plurality of blocks of transform coefficients, the transform coefficients in each of the blocks being inverse quantized using a quantization step size therefor and having a DC transform coefficient, the method comprising the steps of: (a) storing the DC transform coefficient on a block-by-block basis; (b) producing an estimate for the DC transform coefficient; (c) determining whether a first condition that the estimate be greater than or equal to a first value but smaller than a second value is satisfied, wherein the first value represents a difference value defined by subtracting a threshold value from the value for the DC transform coefficient and the second value represents a summation value defined by adding the threshold value to the DC transform coefficient value; (d) selecting the estimate as the compensated image, if the first condition is satisfied; (e) determining whether a second condition that the estimate be smaller than the first value is satisfied, if the first condition is not satisfied; (f) selecting the first value as the compensated image data if the second condition is satisfied; otherwise, selecting the second value as the compensated image data; and (g) repeating said steps (a) to (f).

In accordance with another embodiment of the present invention, there is provided an apparatus for use in an image signal decoding system having means for generating a plurality of blocks of transform coefficients, for compensating the transform coefficients to generate compensated transform coefficients, wherein the transform coefficients in each of the blocks are inverse quantized using a quantizer step size therefor and have a DC transform coefficient, which comprises: means for storing the value of the DC transform coefficient; means for producing an estimate for the DC transform coefficient; first calculating means for calculating a first value through the use of the DC transform coefficient and the quantizer step size, wherein the first value represents a difference value defined by subtracting a threshold value from the value for the DC transform coefficient; second calculating means for calculating a second value through the use of the DC transform coefficient and the quantizer step size, wherein the second value represents a summation value defined by adding the threshold value to the value for the DC transform coefficient; means for determining whether a first condition that the estimate be greater than or equal to the first value but smaller than a second value is satisfied and generating a first selection signal when the first condition is satisfied; means for, when the first condition is not satisfied, determining whether a second condition that the estimate be smaller than the first value is satisfied and for generating a second selection signal when the second condition is satisfied; means for generating a third selection signal when the second condition is not satisfied; means, in response to the first, the second and the third selection signals, for selectively providing the estimate, the first and the second values provided thereto, respectively.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
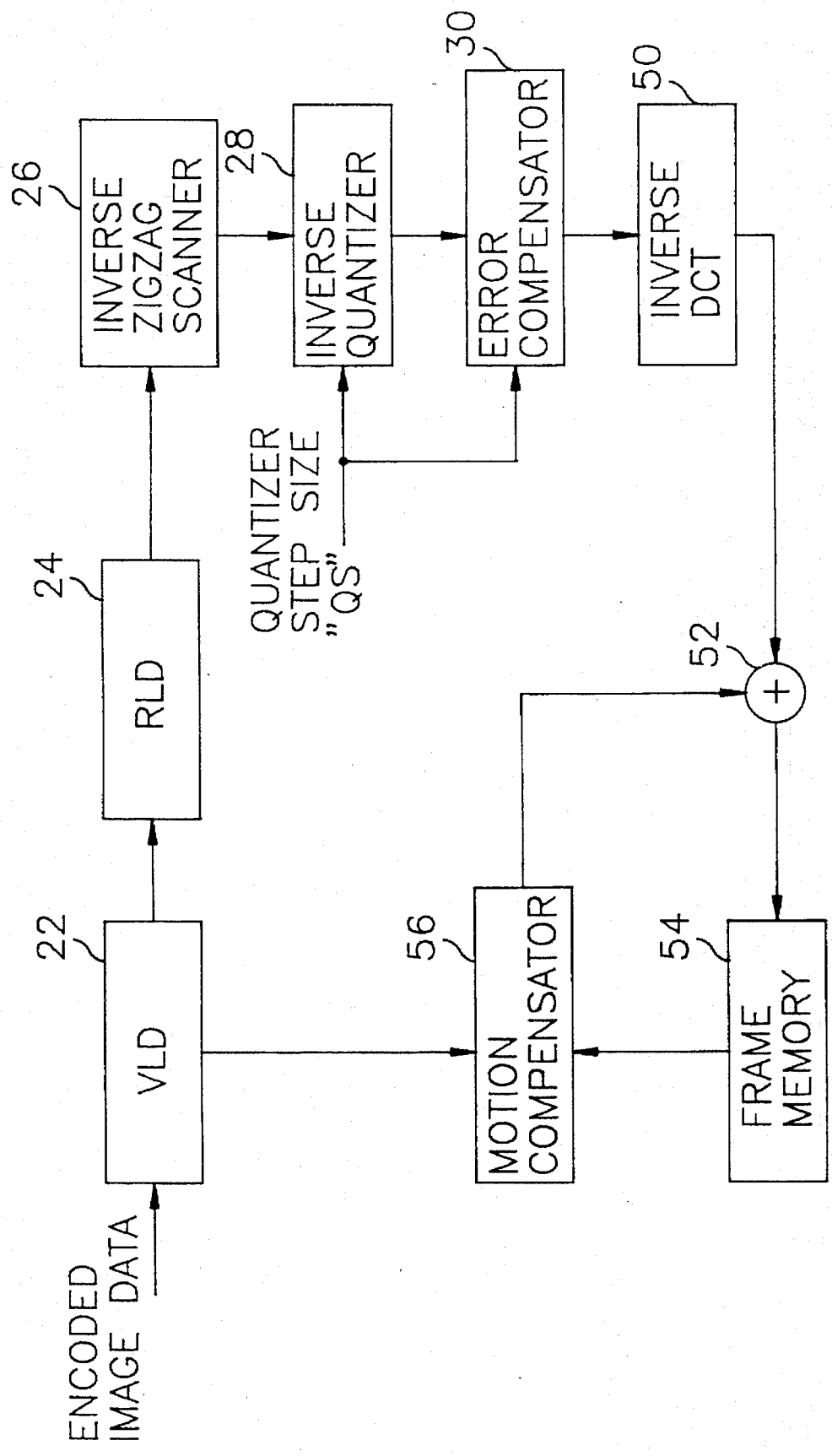
FIG. 1 shows a schematic block diagram of an image signal decoding apparatus modified to include an embodiment of the invention.

Referring to FIG. 1, there is shown an image signal decoding system 100 employing an error compensator 30 of the present invention. The image signal decoding system 100 comprises a variable length decoder (VLD) 22, a run length decoder (RLD) 24, an inverse zigzag scanner 26, an inverse quantizer 28, an inverse discrete cosine transformer (IDCT) 50, an adder 52, a frame memory 54 and a motion compensator 56.

In the image signal decoding system 100, encoded image data, i.e., a series of variable length coded transform coefficients and motion vectors, retrieved from a FIFO buffer (not shown), is provided to the VLD 22. The VLD 22 decodes the set of variable length coded transform coefficients and the motion vectors and provide the transform coefficients to the RLD 24 and the motion vectors to the motion compensator 56. The VLD 22 is basically a look-up table: that is, in the VLD 22, a plurality of code sets is provided to define a respective relationship between a variable length code and its run-length code or motion vector. The transform coefficients decoded to its run-length code are applied to the RLD 24, which is also a look-up table, for generating quantized discrete cosine transform (DCT) coefficients. The quantized DCT coefficients are then provided to the inverse zigzag scanner 26.

At the inverse zigzag scanner 26, the quantized DCT coefficients are reconstructed to provide a plurality of original blocks of, e.g., 8×8, quantized DCT coefficients using a quantizer step size "QS" applied thereto from the FIFO buffer. At the inverse quantizer 28, each block of quantized DCT coefficients is converted into a block of DCT coefficients. As well known in the art, a set of DCT coefficients in each block includes one DC coefficient and a plurality of (e.g., 63) AC coefficients which are statistically distributed in the order of their relative importance in the frequency region. The DC coefficient in each block reflects the average intensity of the pixels in the block.

The set of transform coefficients in each block is transferred to the error compensator 30, with the DC coefficient occurring first, followed by the remaining AC coefficients along a zigzag scanning path starting from a DC value located at the top-left corner of the block. The error compensator 30 compensates the DCT coefficients entailing a quantization error to produce compensated transform coefficients in accordance with a preferred embodiment of the invention, which will be further described hereinafter with reference to FIGS. 2 and 3.

The IDCT 50 functions to transform the set of compensated DCT coefficients from the error compensator 30 into a set of difference data between a block of a current frame and its corresponding block of a previous frame. The difference data transformed at the IDCT 50 is then sent to the adder 52.

In the meanwhile, the motion compensator 56 extracts corresponding pixel data from the previous frame stored in the frame memory 54 based on the motion vector from the VLD 22 and provides the extracted pixel data to the adder 52. The extracted pixel data from the motion compensator 56 and the pixel difference data from the IDCT 50 are then summed up at the adder 52 to thereby constitute representative image data of a given block of the current frame and written onto the frame memory 54. The constituted image data or decoded image data of a block of the current frame is then applied to a display (not shown), to thereby produce a picture with a reduced blocking effect.

Figure 2:
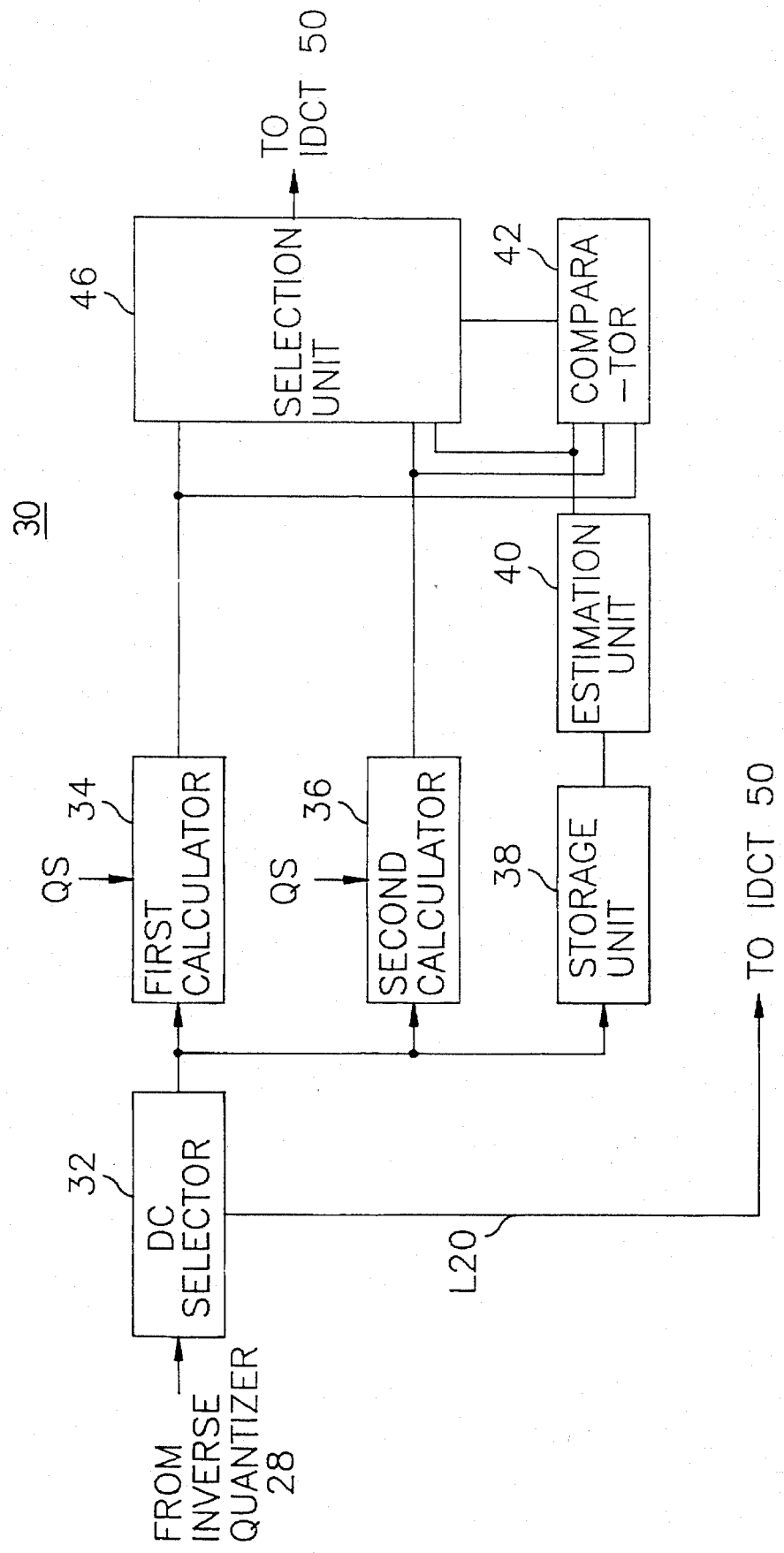
FIG. 2 illustrates a detailed block diagram of the error compensator shown in FIG. 1.
Figure 3:
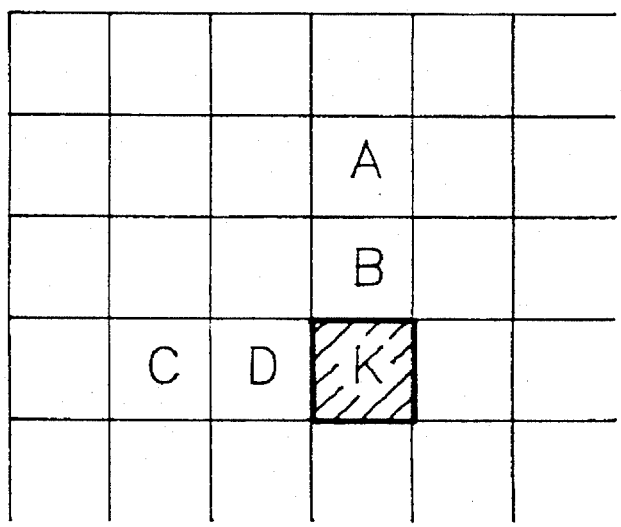
FIG. 3 presents an array of transform coefficient blocks explaining the process of estimating the transform coefficients in accordance with the invention.

Referring now to FIG. 2, there is shown a detailed block diagram of the error compensator 30 shown in FIG. 1. Each blocks of transform coefficients from the inverse quantizer 28 is input to a selection unit 32, a first calculator 34, a second calculator 36 and a storage unit 38. The selection unit 32 serves to select a DC transform coefficient from the set of transform coefficients in each block. An intensity value "Q" of the selected DC transform coefficient is provided to the storage unit 38 for the storage thereof on a block-by-block basis in a sequential order manner, e.g., left to right, top to bottom or in a zigzag manner.

An estimation unit 40 averages the values between the selected DC coefficient block and its neighboring in a horizontal and a vertical directionsbut previously compensated or processed blocks, whose respective coefficient values are stored in the storage unit 38, to produce an estimate for the selected DC transform coefficient. In FIG. 2, assuming that a block "K" is the selected DC coefficient block to be compensated and four blocks "A", "B", "C" and "D" are the previously compensated blocks, the estimate "E" is calculated as follows:

$$E=\{(2*DC_B-DC_A)+(2*DC_D-DC_C)\}/2$$

wherein $DC_A$, $DC_B$, $DC_C$ and $DC_D$ represent the values for the transform coefficients of the blocks A, B, C and D, respectively; and the numeral "2" represents a weight factor.

The weight factor is employed to provide a smooth transition between the intensities of the selected DC coefficient block K and its neighboring blocks, A, B, C and D, and a higher weight factor is applied to the two blocks, B and D, directly adjoining to the selected DC coefficient block K than to the remaining two blocks, A and C.

On the other hand, each of the first and the second calculators 34 and 36 functions to calculate a first and a second compensation values through the use of the intensity value for the selected DC coefficient and the quantizer step size applied thereto, respectively, wherein the first compensation value represents the difference value defined by subtracting a threshold value from the intensity value "Q" of the selected DC coefficient and the second compensation value represents the value defined by the summation of the predetermined threshold and the selected DC transform coefficient. In accordance with the invention, the threshold value corresponds to a maximum quantization error value, i.e., ½×QS. The calculated first and second compensation values are provided to a comparator 42 and a selection unit 46.

The comparator 42 determines whether a first condition that the estimate "E" be greater than or equal to the first value but smaller than the second value is satisfied. When the first condition is satisfied, the comparator 42 generates a first selection signal to the selection unit 46. However, when the first condition is not satisfied, the comparator 42 determines whether a second condition that the estimate be smaller than the first value is satisfied. If the second condition is satisfied, the comparator 42 generates a second selection signal to the selection unit 46. However, if the second condition is not satisfied, the comparator 42 generates a third selection signal to the selection unit 46.

Then, the selection unit 46, in response to the first, the second and the third selection signals, selectively outputs the estimate, the first and the second compensation values, respectively, to the IDCT 50.

Figure 4:
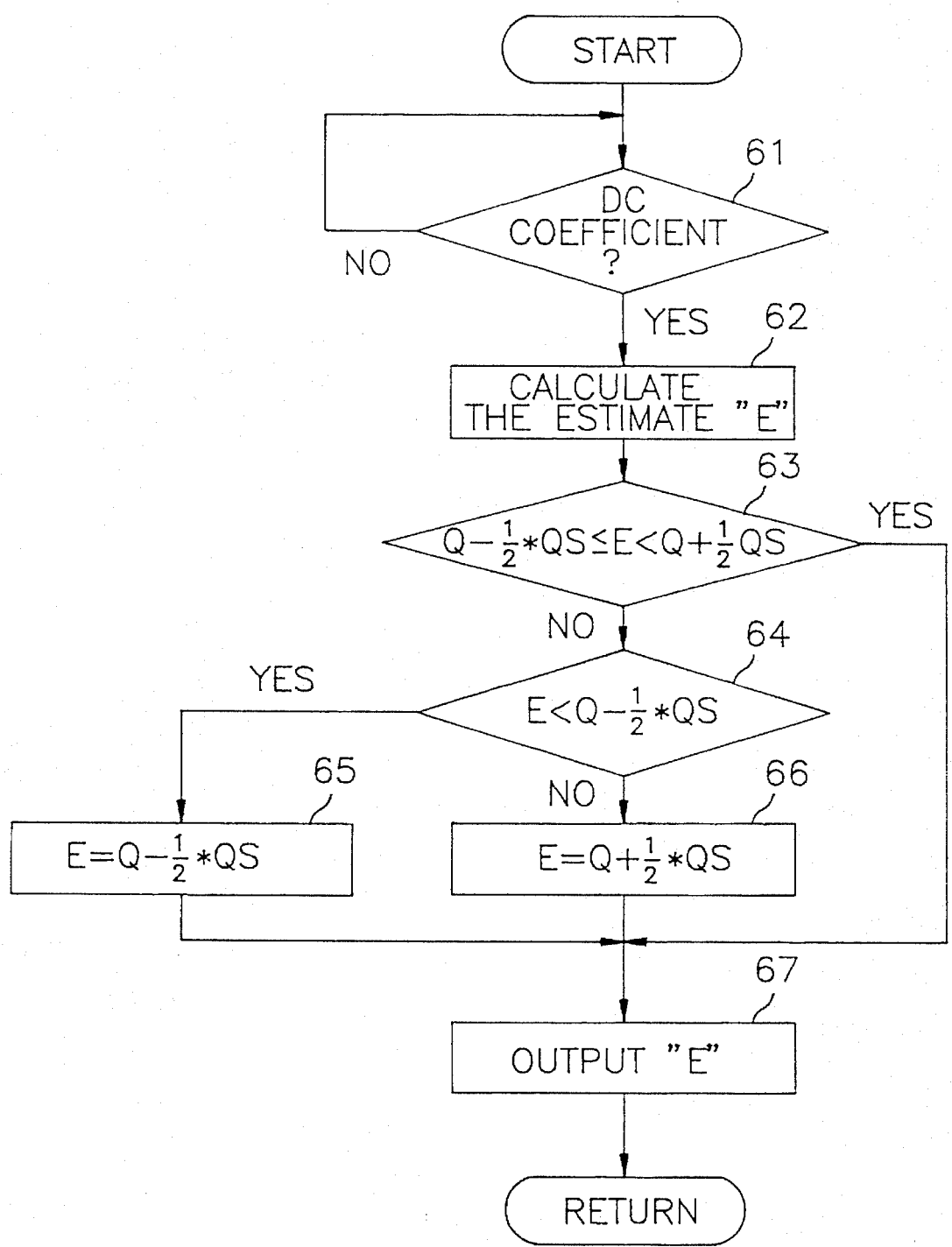
FIG. 4 offers a flow diagram describing the compensation of the inverse quantized transform coefficients in accordance with the invention.

FIG. 4 shows a flow diagram describing the compensation process executed by the error compensator 30 shown in FIG. 2.

The compensation process begins to select a DC transform coefficient as in step 61. The selected DC transform coefficient is stored in the storage unit 38.

In step 62, an estimate for the selected d.c. transform coefficient is calculated through the use of preprocessed blocks of DC coefficients stored in the storage unit 38.

In step 63, it is determined whether the first condition, i.e., $Q-(½×QS) \leq E < Q+(½×QS)$, is satisfied or not; and the estimate is selected and outputted, as in step 67, if the first condition is satisfied.

If the first condition is not satisfied, however, in step 64, it is determined whether the second condition, $E<Q-(½×QS)$, is satisfied or not; and the first compensation value, $Q-(½×QS)$, is selected and outputted, as in step 67, if the second condition is satisfied. Otherwise, the second compensation value, $Q+(½×QS)$, is selected and outputted, as in step 67.

The above process will be repeated until all of the blocks of inverse quantized transform coefficients is compensated.

While the present invention has been shown and described with respect to the preferred embodiments, it will be apparent to those skilled in the art that many changes and modifications may be made without departing from the spirit and scope of the invention as defined in the appended claims.

What is claimed is:

1. A method for compensating image data to generate a compensated image data, wherein the image data includes a plurality of blocks of transform coefficients which is inverse quantized using a quantization step size therefor, each of the blocks having a DC transform coefficient, the method comprising the steps of:

(a) storing the DC transform coefficient on a block-by-block basis;

(b) producing an estimate for the DC transform coefficient;

(c) determining whether a first condition that the estimate be greater than or equal to a first value but smaller than a second value is satisfied, wherein the first value represents a difference defined by subtracting a threshold value from the value for the DC transform coefficient and the second value represents a summation defined by adding the threshold value and the DC transform coefficient;

(d) selecting the estimate as the compensated image data signal, if the first condition is satisfied;

(e) determining whether a second condition that the estimate be smaller than the first value is satisfied, if the first condition is not satisfied;

(f) selecting the first value as the compensated image data signal if the second condition is satisfied; otherwise, selecting the second value as the compensated image data signal; and (g) repeating said steps (a) to (f).

2. The method of claim 1, wherein the step (b) of producing the estimate includes the step of averaging the values between the selected DC coefficient block and its neighboring but previously processed four blocks to produce the estimate for the selected DC transform coefficient, wherein a higher weight factor is applied to the two blocks directly adjoining the selected DC coefficient block than to the remaining two blocks.

3. The method of claim 2, wherein the threshold value is a ½×QS, QS being the quantizer step size.

4. An apparatus, for use in a image signal decoding system having means for generating a plurality of blocks of transform coefficients, for compensating the transform coefficients to generate a compensated transform coefficient, wherein each of the blocks of transform coefficients is inverse quantized using a quantizer step size therefor and has a DC transform coefficient, which comprises:

means for storing the value of the DC transform coefficient on a block-by-block basis;

means for producing an estimate for the DC transform coefficient;

first calculating means for calculating a first value through the use of the value for the DC transform coefficient and the quantizer step size, wherein the first value represents a difference value defined by subtracting a threshold value from the DC transform coefficient;

second calculating means for calculating a second value through the use of the value for the DC transform coefficient and the quantizer step size, wherein the second value represents a summation value defined by adding the threshold value to the DC transform coefficient;

means for determining whether a first condition that the estimate be greater than or equal to the first value but smaller than a second value is satisfied and generating a first selection signal when the first condition is satisfied;

means for, when the first condition is not satisfied, determining whether a second condition that the estimate be smaller than the first value is satisfied and for generating a second selection signal when the second condition is satisfied;

means for generating a third selection signal when the second condition is not satisfied; and means, in response to the first, the second and the third selection signals, for selectively providing the estimate, the first and the second values applied thereto, respectively.

5. The apparatus of claim 4, wherein the estimate producing means includes means for averaging the values between the DC coefficient block and its neighboring but previously processed four blocks to produce the estimate for the DC transform coefficient, wherein a higher weight factor is applied to the two blocks directly adjoining the DC coefficient block than to the remaining two blocks.

6. The apparatus of claim 5, wherein the threshold value is a ½×QS, QS being the quantizer step size.

* * * * *